United States Patent
Xiong (10) Patent No.: US 8,061,986 B2
(45) Date of Patent: Nov. 22, 2011

(54) WIND TURBINE BLADES WITH CONTROLLABLE AERODYNAMIC VORTEX ELEMENTS

(75) Inventor: Wei Xiong, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/813,650

(22) Filed: Jun. 11, 2010

(65) Prior Publication Data

US 2011/0142628 A1  Jun. 16, 2011

(51) Int. Cl.
*F03D 7/02* (2006.01)

(52) U.S. Cl. .... 416/23; 416/235; 416/236 R; 244/204.1; 244/99.8

(58) Field of Classification Search .......... 416/228, 416/235, 236 R, 23; 244/99.8, 200.1, 204, 244/204.1
See application file for complete search history.

(56) References Cited

U.S. PATENT DOCUMENTS

| | | | |
|---|---|---|---|
| 4,039,161 A | 8/1977 | Bauer | |
| 5,253,828 A | 10/1993 | Cox | |
| 6,105,904 A * | 8/2000 | Lisy et al. | 244/200.1 |
| 6,220,550 B1 * | 4/2001 | McKillip, Jr. | 244/215 |
| 6,315,686 B1 | 11/2001 | Barfield | |
| 6,427,948 B1 | 8/2002 | Campbell | |
| 6,629,341 B2 | 10/2003 | Wilkie et al. | |
| 6,705,838 B1 | 3/2004 | Bak et al. | |
| 6,939,253 B2 | 9/2005 | Ogg | |
| 7,293,959 B2 | 11/2007 | Pedersen et al. | |
| 7,419,356 B2 * | 9/2008 | Stiesdal | 416/1 |
| 7,429,074 B2 * | 9/2008 | Mc Knight et al. | 296/180.1 |
| 7,585,157 B2 | 9/2009 | Quell et al. | |
| 7,604,461 B2 * | 10/2009 | Bonnet | 416/235 |
| 7,748,958 B2 * | 7/2010 | McVeigh et al. | 416/1 |
| 7,878,457 B2 * | 2/2011 | Narramore | 244/200.1 |
| 2003/0218102 A1 | 11/2003 | Van Dam et al. | |
| 2006/0140760 A1 | 6/2006 | Saddoughi et al. | |
| 2007/0110585 A1 | 5/2007 | Bonnet | |
| 2007/0231151 A1 | 10/2007 | Herr et al. | |
| 2008/0175711 A1 | 7/2008 | Godsk | |
| 2008/0272615 A1 | 11/2008 | McKnight et al. | |
| 2009/0068018 A1 | 3/2009 | Corten | |
| 2009/0120205 A1 | 5/2009 | Clingman | |
| 2010/0104436 A1 | 4/2010 | Herr et al. | |

FOREIGN PATENT DOCUMENTS

| | | |
|---|---|---|
| EP | 0947693 | 10/1999 |
| EP | 1674723 | 6/2006 |
| EP | 1772623 | 4/2007 |
| EP | 1896323 | 3/2008 |

(Continued)

OTHER PUBLICATIONS

English Abstract of EP 0947693.

(Continued)

*Primary Examiner* — Edward Look
*Assistant Examiner* — Ryan Ellis
(74) *Attorney, Agent, or Firm* — Dority & Manning, P.A.

(57) ABSTRACT

A wind turbine blade has a suction side surface and a pressure side surface. A plurality of dynamic vortex elements are formed on at least one of the suction side or the pressure side surfaces. The vortex elements are activatable between a first retracted position that is inwardly recessed relative to a neutral plane of the surface on which they are formed and a second extended position that is outwardly protruding relative to the neutral plane of the surface.

16 Claims, 5 Drawing Sheets

FOREIGN PATENT DOCUMENTS

| | | |
|---|---|---|
| EP | 1944505 | 7/2008 |
| EP | 2098721 | 9/2009 |
| JP | 4029063 | 1/1992 |
| WO | WO 00/15961 | 3/2000 |
| WO | WO 01/16482 | 3/2001 |
| WO | WO 01/33648 A1 | 5/2001 |
| WO | WO 02/29247 A1 | 4/2002 |
| WO | WO 2007/005687 | 1/2007 |
| WO | WO 2007/065434 | 6/2007 |
| WO | WO 2007/140771 | 12/2007 |
| WO | WO 2008/113349 | 9/2008 |
| WO | WO 2008/113350 | 9/2008 |

OTHER PUBLICATIONS

English Abstract of JP 4029063.

van Dam, C.P.; "Airfoils for Structures-Passive and Active Load Control for Wind Turbine Blades", Department of Mechanical and Aeronautical Engineering, University of California-Davis.

Vronsky, T.; "High Performance Cost-Effective Large Wind Turbine Blades Using Air-Jet Vortex Generators", ETSU W/41/00541/REP, 2000.

EPO Search Report, Sep. 12, 2011.

* cited by examiner

WIND TURBINE BLADES WITH CONTROLLABLE AERODYNAMIC VORTEX ELEMENTS

FIELD OF THE INVENTION

The present invention relates generally to the field of wind turbines, and more particularly to turbine blades having an aerodynamic surface configuration.

BACKGROUND OF THE INVENTION

Turbine blades are the primary elements of wind turbines for converting wind energy into electrical energy. The working principle of the blades resembles that of airplane wings. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Airflow over the leading edge of the blade is mainly laminar in an "attached-flow" region. The lift force is generated primarily in this attached-flow region. As the air moves towards the trailing edge of the blade, flow separation occurs and the air flow transitions to a "detached-flow" region where the flow is more turbulent. Flow separation depends on a number of factors, such as incoming air flow characteristics (e.g. Reynolds number, wind speed, in-flow atmospheric turbulence) and characteristics of the blade (e.g. airfoil sections, blade chord and thickness, twist distribution, pitch angle, etc). The detached-flow region also leads to an increase in drag force, mainly due to a pressure difference between the upstream attached-flow region and the downstream detached-flow region.

Hence, in order to increase the energy conversion efficiency during normal operation of the wind turbine, it is desired to increase the lift force while decreasing the drag force. To this purpose, it is advantageous to increase the attached-flow region and to reduce the detached-flow region by having the flow separation nearer the trailing edge of the blade, i.e. in a downstream region of the blade. Also, it is generally desired to have a stable flow separation in order to increase the working stability and decrease noise generation of the blade.

It is know in the art to change the aerodynamic characteristics of wind turbine blades by adding dimples, protrusions, or other structures on the surface of the blade. These structures are often referred to as "vortex generators" and serve to create micro-turbulent regions of airflow over the surface of the blade. This results in flow transition stability in relatively low velocity regions of the blade generally closer to the blade root. At the relatively higher velocity regions of the blade closer to the blade tip, the vortex generators serve to extend the flow separation of the airflow towards the trailing edge of the blade to generate more lift and reduce drag.

Static or fixed vortex generating elements are known. Reference is made, for example, to WO 2007/065434; WO 00/15961; and U.S. Pat. No. 7,604,461. The vortex elements in these references have a defined shape, size, and configuration that does not change and, thus, the versatility of the elements for varying airflow conditions is limited.

Retractable or pivotal vortex generators that are deployed relative to the surface of a blade are also known. Reference is made, for example, to U.S. Pat. No. 4,039,161; U.S. Pat. No. 5,253,828; U.S. Pat. No. 6,105,904; U.S. Pat. No. 6,427,948; and WO 2007/005687.

EP 1 896 323 B1 describes a pivotal vortex generator in the form of a flat member that lies on the flow control surface in a retracted state and pivots at an angle from the surface in an extended state. The vortex generator may be formed from a shape memory alloy that is actuated by a heater. The reference describes that other types of actuators may be used to impart a pivoting action to the vortex generator, including a piezoelectric bimorph actuator.

U.S. Pat. No. 7,293,959 describes a wind turbine blade having lift-regulating means in the form of flexible flaps extending in the longitudinal direction along the trailing edge and leading edge of the suction side of the blade. The flaps are activated at high wind speeds to reduce the lift of the blade. The activating means may be piezoelectric.

Although the vortex generators discussed in the references cited above may be considered "dynamic" in that they are deployed to an active state, the usefulness of the elements in the "at rest" state is minimal.

Accordingly, the industry would benefit from a wind turbine blade having dynamic vortex generating elements that provide enhanced aerodynamic surface characteristics in both an active and non-active state over a wider range of wind and airflow conditions.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having a suction side surface and a pressure side surface. A plurality of dynamic vortex elements are formed on either one or both of the surfaces. The vortex elements are activatable or deployable to a first retracted position that is inwardly recessed relative to a neutral plane of the surface in which they are formed to define recessed vortex generating elements, and to a second extended position that is outwardly protruding relative to the neutral plane of the surface in which they are formed to define protruding vortex generating elements.

In a particular embodiment, the respective blade surface includes a depression formed therein at the location of each of the vortex elements. The vortex elements may be made of a flexible material sheet that is disposed over the depression. The material sheet conforms into the depression in the first retracted position and expands outwardly over the depression in the second extended position. An activating mechanism may be configured with the material sheet to move or deploy the material sheet between the respective positions. In a particularly unique embodiment, the material sheet comprises a piezoelectric material and the activating mechanism includes a controllable power source connected to the piezoelectric material. The characteristics of the power supplied to the piezoelectric material determines whether the material assumes an extended or retracted configuration with respect to the neutral plane of the blade surface. The power characteristics may be varied to produce a correspondingly varied shape of the vortex elements in the extended configuration. The plurality of vortex elements may be supplied with a common controlled power source so that they act in unison, or they may be individually supplied and controlled for more precise control. Alternatively, the vortex elements may be subdivided into groups, with each of the groups being individually controlled.

In yet another embodiment, the wind turbine blade may include static vortex elements in addition to the dynamic vortex elements. The static elements may be segregated from or interspersed with the dynamic vortex elements.

The particular shape and configuration of the dynamic vortex elements is not a limiting factor. In a particular embodiment, the elements are generally hemispherical in shape in both the retracted and expanded configuration. Any desired shape, orientation, or other geometric characteristic of the vortex elements is within the scope and spirit of the invention.

In another unique embodiment, the vortex elements may also be configured to assume a third neutral position wherein the elements are coextensive with the neutral plane of the blade surface and are thus essentially flush with the blade surface.

The invention also encompasses a wind turbine having one or more turbine blades configured with the dynamic vortex elements as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Figure 1:
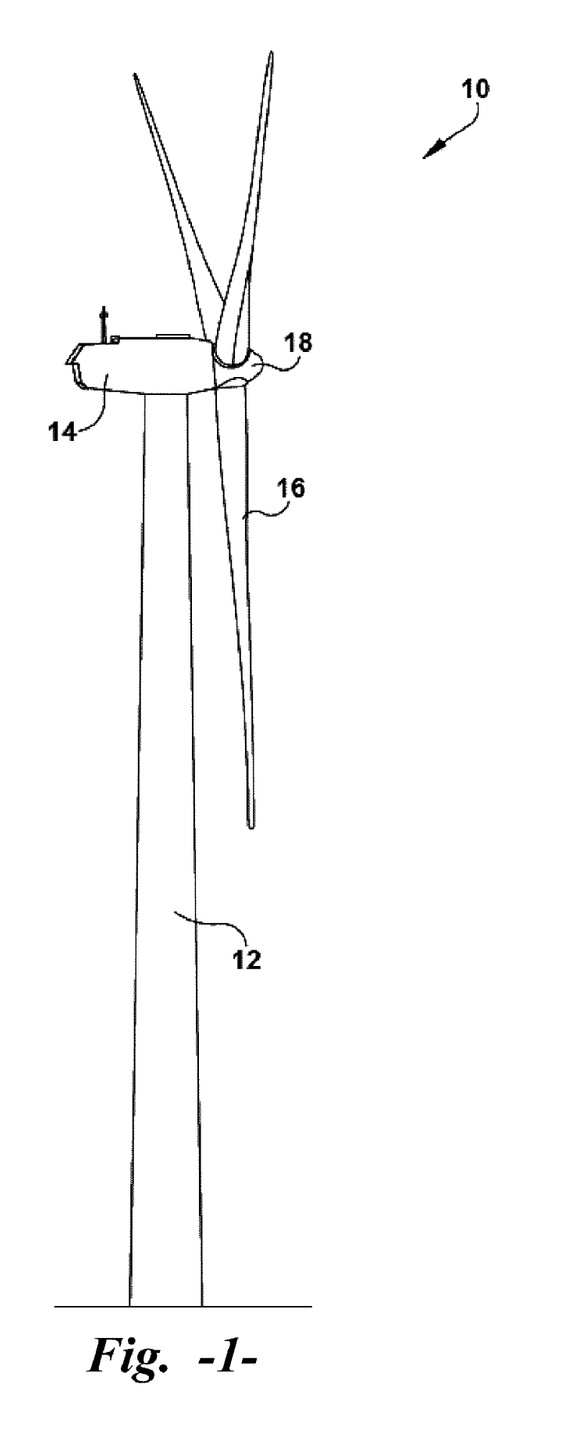
FIG. 1 is a perspective view of a conventional wind turbine.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figures 2, 3:
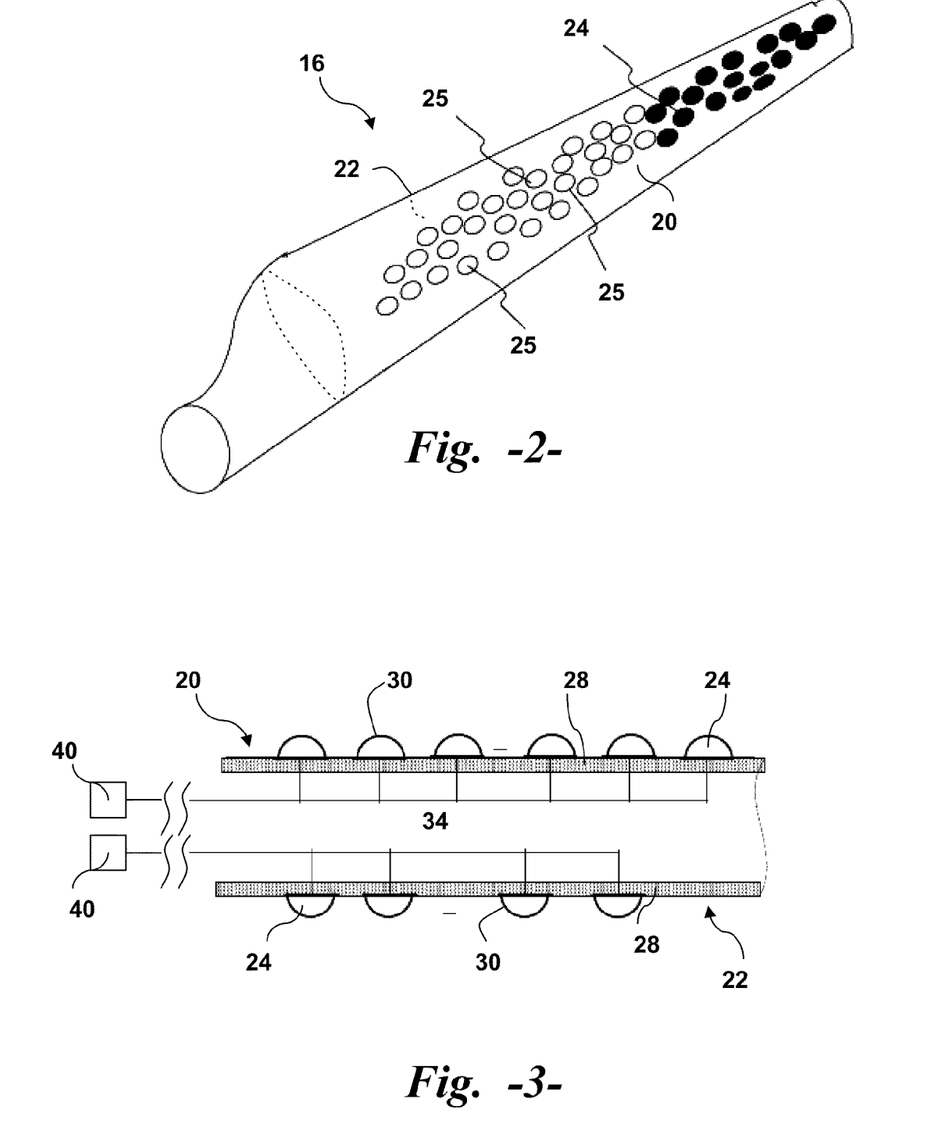
FIG. 2 is a perspective view of an embodiment of a wind turbine blade in accordance with aspects of the invention.
FIG. 3 is a side diagrammatic view of an embodiment of a wind turbine blade.
Figure 4:
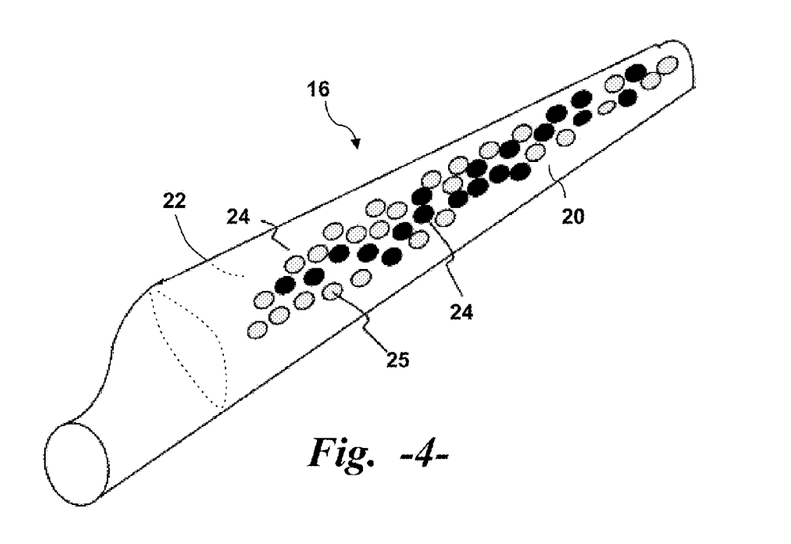
FIG. 4 is a perspective view of an alternate embodiment of a wind turbine blade.
Figure 6:
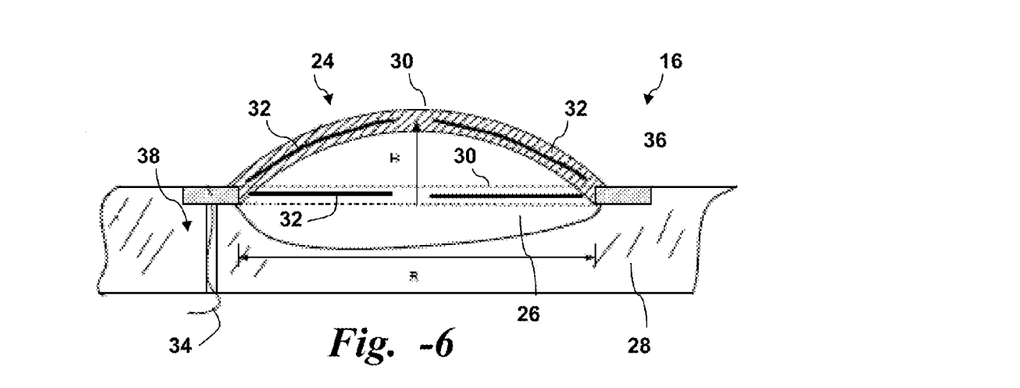
FIG. 6 is a side diagrammatic and operational view of a particular embodiment of a vortex element in an extended position relative to a surface of the turbine blade.
Figure 7:
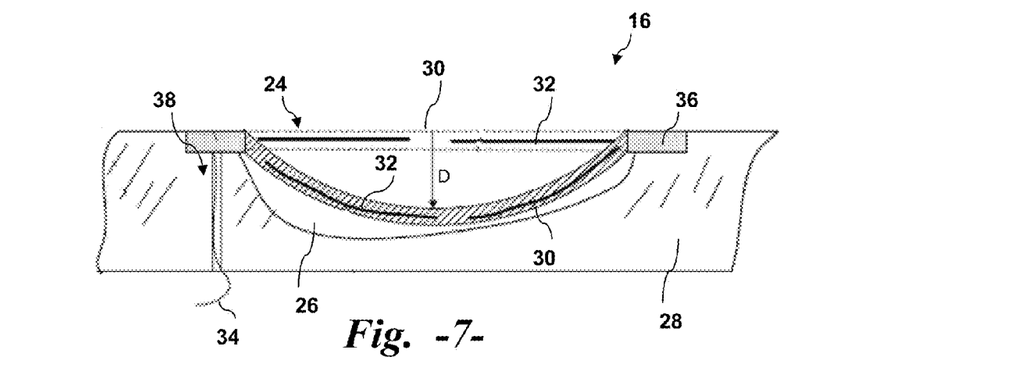
FIG. 7 is a side diagrammatic and operational view of the vortex element of FIG. 6 in a retracted position relative to the surface of the turbine blade.

FIGS. 2 and 4 depict embodiments of a wind turbine blade 16 incorporating aspects of the invention. The blades 16 include a suction side surface 20 and a pressure side surface 22. A plurality of dynamic vortex elements 24 are formed on either or both of the surfaces 22 and 24. In the embodiment illustrated in FIGS. 2 and 4, the vortex elements 24 are depicted on the suction side 20. The vortex elements 24 are "dynamic" in that they are activated or deployed between different operational positions. In particular, the vortex elements 24 are activated to a first retracted position wherein the elements 24 are inwardly recessed relative to a neutral plane of the respective surface on which they are formed. An embodiment of a vortex element 24 in this retracted state is depicted in FIG. 7. The vortex elements 24 are deployed or activated to a second extended position that is outwardly protruding relative to the neutral plane of the surface on which they are formed, as depicted in FIG. 6. It should thus be appreciated that the vortex elements 24 form recessed vortex generators in a first state and protruding vortex generators in a second state.

The vortex elements 24 may be used in combination with conventional fixed vortex generators 25 (such as fixed fins, wedges, and the like) in any pattern on the turbine blade surface to modify the aerodynamic characteristics of the blade 16. For example, in the embodiment depicted in FIG. 2, the darkened elements are dynamic vortex elements 24 (recessed or protruding) located at the tip section of the blade 16, and the lighter elements are static or fixed vortex generators 25. In the embodiment of FIG. 4, the dynamic vortex elements 24 are located along the length of the blade 16, as are the static vortex generators 25. In addition, the plurality of vortex elements 24 may be divided into distinct groups, wherein a first one of the groups includes all of the vortex elements 24 in an extended position and a separate distinct group includes all vortex elements 24 in a retracted or recessed position.

The surfaces 20, 22 of the blade 16 on which the vortex elements 24 are formed has a "neutral" plane that corresponds to the smooth surface of the blade between the vortex elements 24. Referring to FIG. 6, the vortex element 24 in its expanded state extends a height "H" above the neutral plane that surrounds the vortex element 24. Likewise, in the configuration of the vortex element 24 in FIG. 7, the element 24 has a recess depth "D" relative to the neutral plane of the surface that surrounds the vortex element 24.

Referring to FIGS. 6 and 7 in particular, the blades 16 include an outer skin 28 formed of any suitable material, such as a molded material, laminate material, and so forth. A depression 26 is formed in the skin material 28 at the location of each of the vortex elements 24. The vortex elements 24 include a flexible material sheet 30 that is disposed over the depression 26. In the retracted position of the vortex element 24, this flexible material sheet 30 conforms into the depression 26 to define a recessed vortex generator. In the second extended position of the vortex element 24, the flexible material sheet 30 expands outwardly over the depression 26 to define a protruding vortex generator relative to the neutral plane of the skin 28, as depicted in FIG. 6. The flexible material sheet 30 may be defined by any material that is flexible enough to conform into the depression 26 and to expand outwardly from the depression while withstanding the environmental conditions of the wind turbine blade. It should be appreciated that the invention is not limited to any particular type of flexible material sheet 30. A retaining ring or other structure 36 may be utilized to attach the flexible material sheet 30 to the skin 28. This ring 36 may be embedded within a groove or channel defined around the depression 26, as illustrated in FIGS. 6 and 7. In an alternative embodiment, the flexible material sheet 30 may be adhered or mechanically fastened to the skin 28 around the depression 26.

An activating mechanism, generally 38, is provided for deploying the flexible material sheet 30 between the retracted and extended states. The activating mechanism 38 may be any manner of suitable system or mechanism, such as a pneumatic system, hydraulic system, electro/mechanical system, and the like. For example, in a particular embodiment not illustrated in the figures, the depression 26 may be supplied with a pressurized air source to expand the flexible material sheet 30 to the position illustrated in FIG. 6. To retract the sheet 30, suction may be applied to remove the air and draw the sheet 30 into conformity within the depression 26, as depicted in FIG. 7. The activating mechanism 38 may also vary the degree or extent of protrusion of the vortex elements in the extended state. For example, the pneumatic or hydraulic system may be variably adjustable to cause the vortex elements to protrude by varying degrees relative to the neutral surface of the skin 28.

Figure 8:
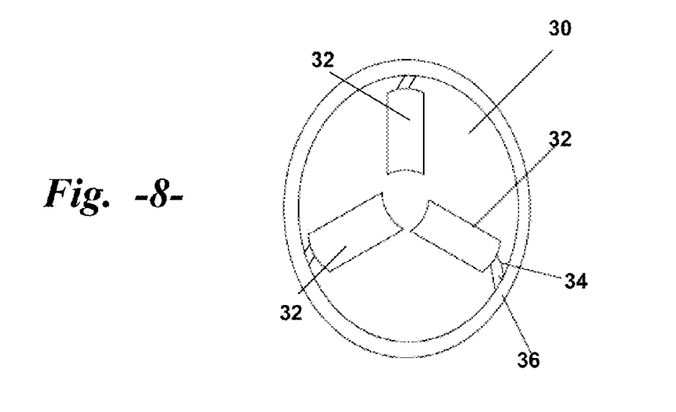
FIG. 8 is a top diagrammatic view of a hemispherical embodiment of a vortex element; and, FIG. 9 is a front view of a turbine rotor hub and blades.

In a particularly unique embodiment, the activating mechanism 38 includes a piezoelectric material 32 that is incorporated with the flexible sheet material 30. The piezoelectric material 32 may be in the form of strips (as indicated in FIG. 8) that are embedded or otherwise attached to portions of the flexible sheet material 30. In an alternative embodiment, the piezoelectric material 32 may be in the form of fibers that are distributed in any desired pattern or configuration throughout the flexible material sheet 30.

The operation of piezoelectric actuators is well known and need not be described in detail herein. In general, conventional piezoelectric fiber composite actuators include a layer of extruded piezoelectric fibers encased in a protective polymer matrix material. Interdigitated electrodes are etched or otherwise deposited onto the polymer film layers on the top and bottom of the fibers to form a thin actuator laminate that can be easily embedded within or placed on various types of surfaces. The frequency and voltage characteristics of the power supplied to the piezoelectric material dictates the shape the material assumes when activated. A particular type of piezoelectric material 32 that may be useful in practice of the present invention is described, for example, in U.S. Pat. No. 6,629,341. It should be appreciated, however, that other piezoelectric materials may also be suitable.

FIGS. 6 through 8 depict the individual vortex elements 24 as generally hemispherical in shape. This shape may be achieved by the use of distinct equally spaced pieces of piezoelectric material, as depicted in FIG. 8, which cause the flexible material sheet 30 to protrude outwardly in a generally uniform hemispherical shape at a certain voltage/frequency applied to the materials 32, and to conform inwardly to the generally hemispherical shape of the depression 26 in the retracted position of the vortex element 24.

The characteristics of the power supplied to the piezoelectric materials 32 may also be controlled to produce varying degrees of extension, and thus varying shapes of the vortex elements.

It should be readily appreciated, however, that the vortex elements 24 are not limited to any particular shape or configuration, and that any manner or configuration of piezoelectric materials 32 may be utilized to achieve any desired shape of a vortex element, including wedge shapes, flaps, and the like.

The piezoelectric materials 32 may be supplied with a power source via leads 34. The leads 34 may be incorporated into the retaining ring structure 36, which may thus act as an electrical distribution manifold or bus for all of the various piezoelectric material pieces 32 associated with a particular vortex element 24. Other configurations for supplying the piezoelectric materials 32 with power are within the scope and spirit of the invention.

Figure 5:
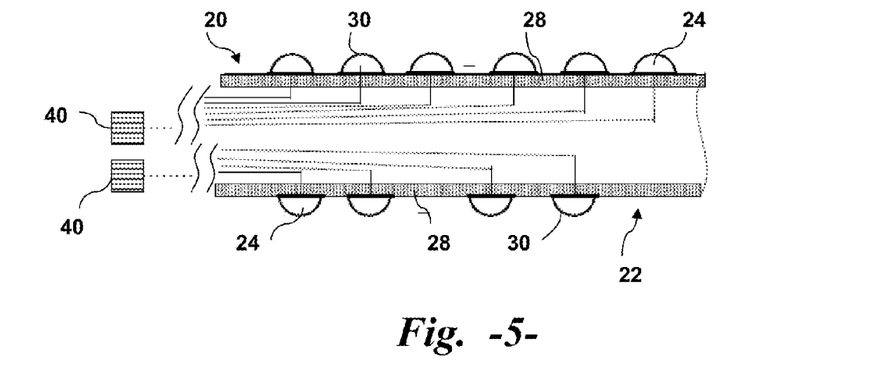
FIG. 5 is a side diagrammatic view of an alternate embodiment of a wind turbine blade.

In a particular embodiment, all or distinct groups of the vortex elements 24 on a blade 16 may be supplied with a common controllable power source 40, as depicted in FIG. 3. With this configuration, all of the vortex elements 24 in communication with the same power source 40 will assume the same operational state. In other words, all of the elements 24 within a group connected to the same power source 40 will either be expanded or retracted depending on the characteristics of the power supplied by the common power source 40. In the embodiment illustrated in FIG. 3, the vortex elements 24 on the suction side surface 20 are supplied by a single power source 40 and the elements 24 on the pressure side surface 22 are supplied by a different power source 40. Thus, with this arrangement, the elements 24 on the suction side may be deployed to an expanded state illustrated in FIG. 6, while the elements 24 on the pressure side 22 may be activated into a recessed state as indicated in FIG. 7. FIGS. 4 and 5 illustrate an embodiment wherein the vortex elements 24 on the respective surfaces 20, 22 are individually controlled by respective power sources 40. In this manner, any desired pattern or configuration of recessed and expanded vortex elements 24 may be designed, as depicted in FIG. 4 wherein the darkened elements 24 are meant to depict expanded vortex elements and the lighter shaded elements 24 are meant to depict recessed vortex elements.

Referring to FIGS. 6 and 7, it may be desired in certain situations for the vortex elements 24 to assume a third operational state wherein the surface of the vortex elements 24 is co-extensive with the neutral plane of the surrounding surface of the blade, as depicted by the dashed lines in FIGS. 6 and 7. There may be wind and air flow conditions existing wherein the usefulness or desirability of vortex elements is minimal and possibly detrimental due to drag induced by the vortex elements. In such conditions, the flexible material sheet 30 may be deployed to the "flat" profile state illustrated by the dashed configurations in FIGS. 6 and 7 wherein the elements 24 become essentially non-operational.

Figure 9:
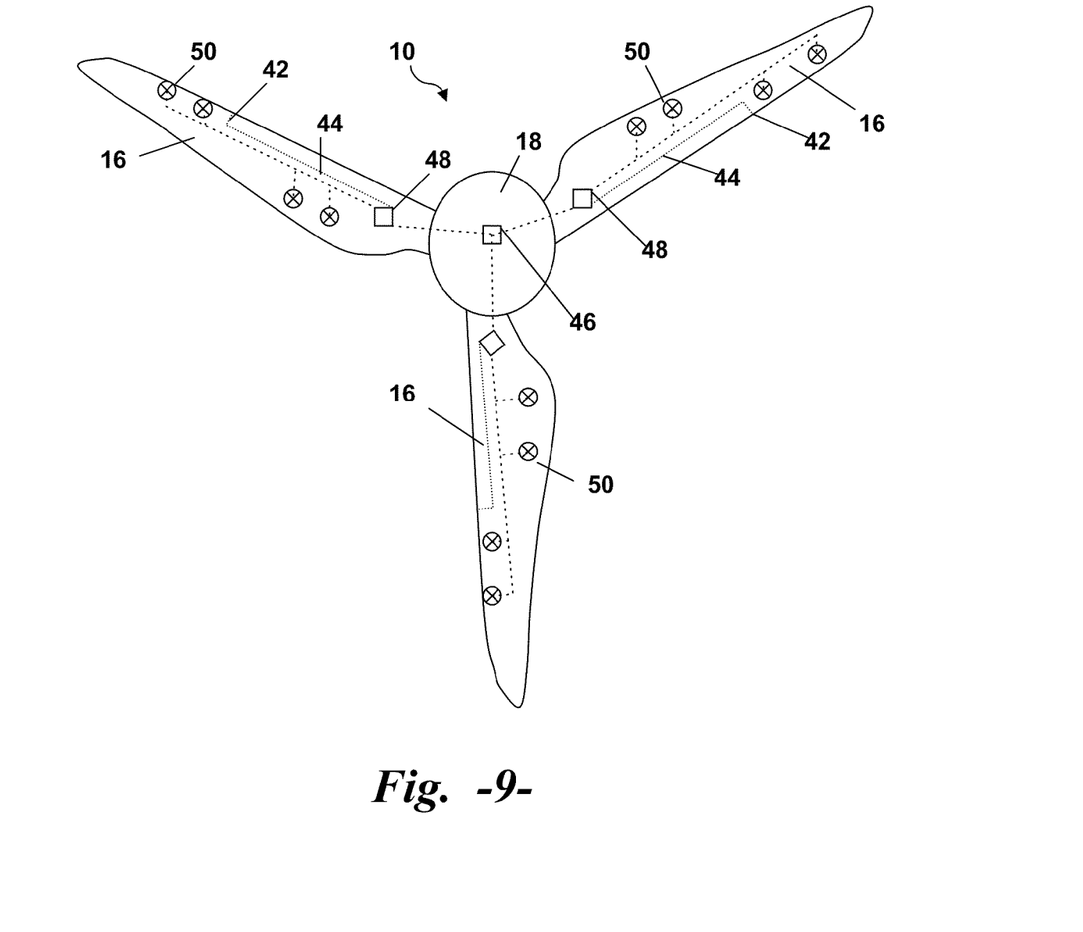

FIG. 9 depicts a rotor hub 18 with a plurality of blades 16 configured in accordance with aspects of the invention. In this particular embodiment, each of the blades 16 includes a plurality of groups 50 of vortex elements 24 as described herein. Each of the groups 50 is in communication with a controller 48 associated with each blade 16. The controller 48 dictates the characteristics of the power source supplied to the individual groups 50, or to the individual vortex elements within each of the groups 50, depending on the control scheme utilized for each blade 16. The respective controllers 48 are, in turn, in communication with a central controller/power source 46 that may be operationally configured within the hub 18 or nacelle 14 (FIG. 1). The individual controllers 48 may be supplied with control signals in response to the respective wind or other environmental conditions experienced by the individual blade 16 as detected by any manner of sensor 42 provided on a surface of the blade 16. For example, the sensor 42 may be a load sensor, stall sensor, or any other type of sensor that is useful for determining the aerodynamic conditions of the blades 16. The sensor 42 may supply a signal via the line 44 to the individual respective controllers 48 for near-instantaneous control of the vortex elements 24 associated with each of the respective blades 16.

Still referring to FIG. 9, it should also be appreciated that, although individual respective blade control may be desirable, that such control is not mandatory and that the invention encompasses common control of all of the vortex elements 24 associated with the blades 16 based on the conditions sensed by any one or all of the blades 16 via sensors 42.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, said blade comprising:
   a suction side surface and a pressure side surface;
   a plurality of dynamic vortex elements formed on at least one of said suction side or said pressure side surfaces between leading and trailing edges of said blade;
   said vortex elements activatable to either of a first retracted position that is inwardly recessed relative to a neutral plane of said surface or a second extended position that is outwardly protruding relative to said neutral plane of said surface;
   a depression in said surface at the location of each of said vortex elements, said vortex elements comprising a flexible material sheet disposed completely over said depression, wherein said material sheet conforms into said depression in said first retracted position and expands outwardly over said depression in said second extended position; and
   an activating mechanism configured with said material sheet to move said material sheet between said first retracted position and said second extended position.

2. The wind turbine blade as in claim 1, wherein said material sheet is variably extensible in said second extended position to produce vortex elements of varying size or shape.

3. The wind turbine blade as in claim 1, wherein said material sheet comprises a piezoelectric material, said activating mechanism comprising a controllable power source connected to said piezoelectric material.

4. The wind turbine blade as in claim 3, wherein said power source is configured to supply a variable power to said piezoelectric material such that said material sheet is variably extensible in said second extended position to produce vortex elements of varying size or shape.

5. The wind turbine blade as in claim 3, wherein said plurality of vortex elements are supplied with a common controlled power source.

6. The wind turbine blade as in claim 3, wherein said plurality of vortex elements are divided into separately controlled groups, with each of said groups being supplied with a respective controlled power source.

7. The wind turbine blade as in claim 3, wherein said plurality of vortex elements are individually controlled with a respective controlled power source.

8. The wind turbine blade as in claim 1, wherein said vortex elements are generally hemispherical in said first retracted position and in said second extended position.

9. The wind turbine blade as in claim 1, wherein said vortex elements comprise a third neutral position coextensive with said neutral plane of said surface.

10. The wind turbine blade as in claim 1, wherein said vortex elements are formed on said suction side surface and said pressure side surface.

11. The wind turbine blade as in claim 1, further comprising a plurality of static vortex generators provide on said suction side surface or said pressure side surface in combination with said vortex elements.

12. A wind turbine, said wind turbine comprising a plurality of turbine blades, at least one of said turbine blades comprising:
    a suction side surface and a pressure side surface;
    a plurality of dynamic vortex elements formed on at least one of said suction side or pressure side surfaces;
    said vortex elements activatable to a first retracted position that is inwardly recessed relative to a neutral plane of said surface and a second extended position that is outwardly protruding relative to said neutral plane of said surface;
    a depression in said surface at the location of each of said vortex elements, said vortex elements comprising a flexible material sheet disposed completely over said depression, wherein said material sheet conforms into said depression in said first retracted position and expands outwardly over said depression in said second extended position; and
    an activating mechanism configured with said material sheet to move said material sheet between said first retracted position and said second extended position.

13. The wind turbine as in claim 12, wherein said material sheet comprises a piezoelectric material, said activating mechanism comprising a controllable power source connected to said piezoelectric material.

14. The wind turbine as in claim 12, further comprising a plurality of static vortex generators configured on said surface of said blade in combination with said vortex elements.

15. The wind turbine as in claim 12, wherein said vortex elements are generally hemispherical in said first retracted position and in said second extended position.

16. The wind turbine as in claim 12, wherein said vortex elements comprise a third neutral position coextensive with said neutral plane of said surface.

* * * * *